Patented June 9, 1942

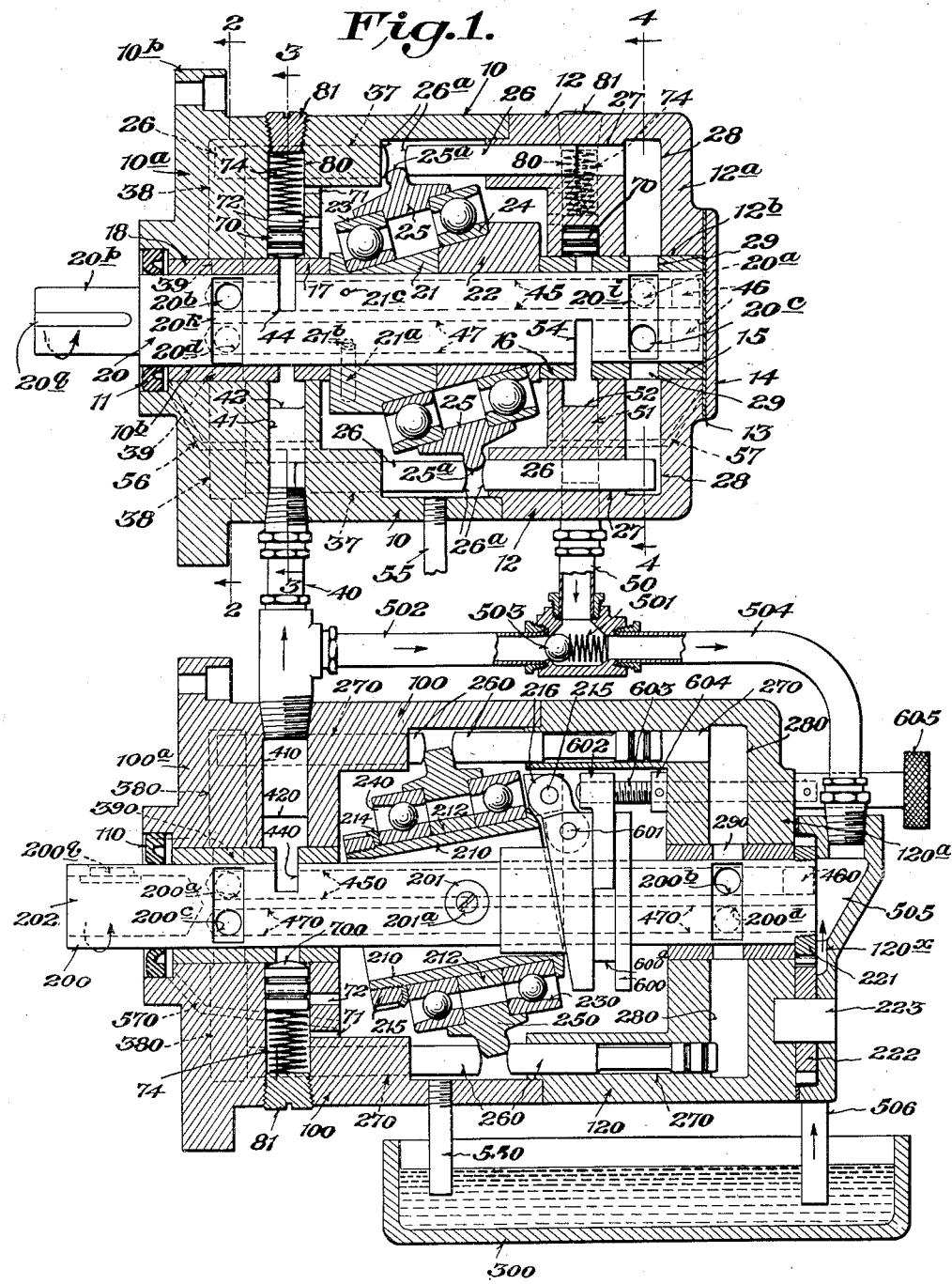

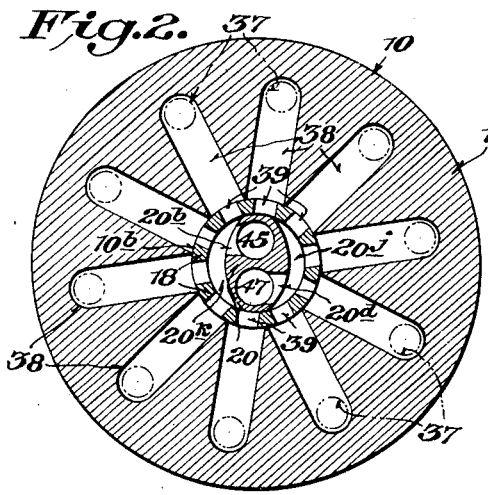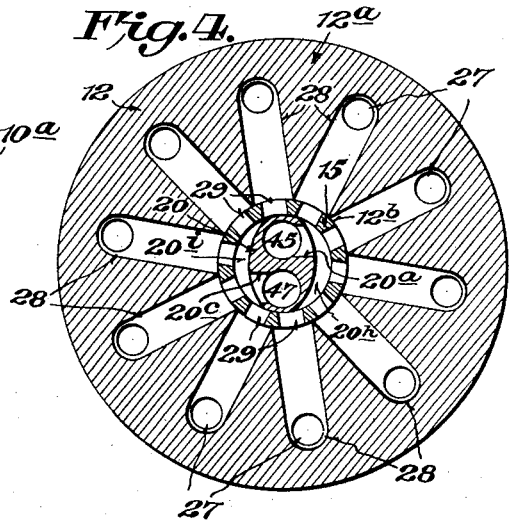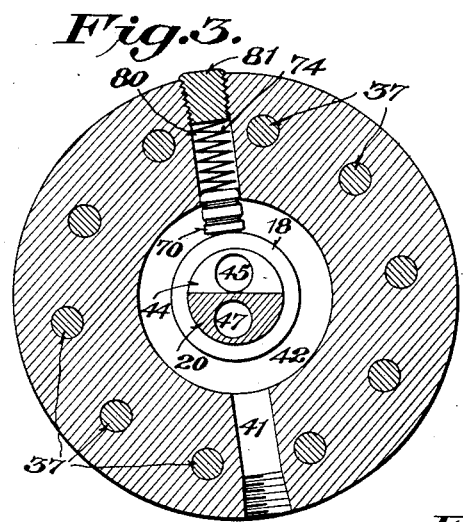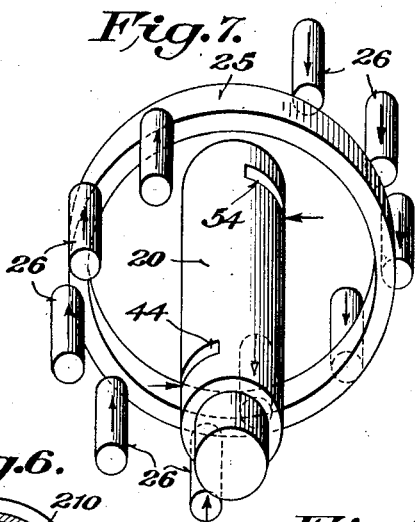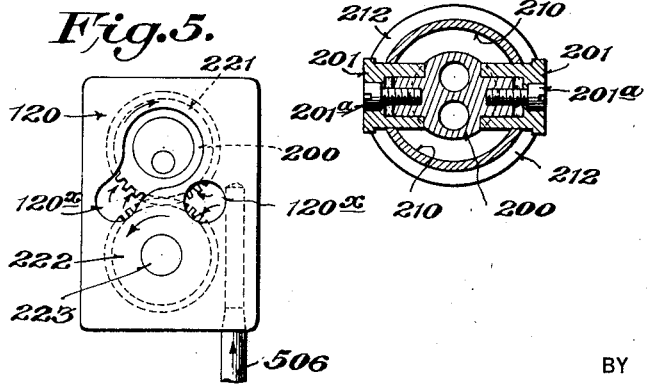

2,286,063

UNITED STATES PATENT OFFICE 2,286,063

TRANSMISSION OR THE LIKE

Robert S. Condon, Rutland, Vt.

Application March 6, 1939, Serial No. 260,269

13 Claims. (Cl. 121—119)

This invention relates to variable speed transmissions and the like; and the principal object of the invention is to provide a transmission consisting of a variable delivery type fluid pump driven by a constant speed prime mover, said pump actuating a constant displacement type fluid motor by means of fluid ducts connecting the pump and motor and a sump tank which latter is adapted to supply the fluid circuit with small quantities of fluid to replace any that may be lost due to leakage, the variation in speed of the motor being accomplished by varying the delivery of the pump.

Further objects are to provide a unit of the above type in which the rotating parts are in complete hydraulic balance; a unit so designed that the motor may be operated at a distance from the pump or prime mover, or the pump and motor can be mounted adjacent each other in a common housing; also a unit of economical manufacture having novel and efficient mechanical and hydraulic features involving the use (1) of opposed sets of pistons operating on the same floating wabble plate; (2) an arrangement of porting at each end of shaft so designed that the moment on the rotating parts caused by the hydraulic thrusts at the ports is opposite in direction from the moment on the rotating parts caused by the mechanical thrust of the pistons on the wabble plate; (3) a rotating shaft provided with one duct therein to carry fluid under pressure, and a second duct parallel with the first and carrying the exhaust, said ducts each having a port connecting their respective duct with the fluid pressure or exhaust, said shaft being further designed to act as a valve to connect the pressure and exhaust ducts with the proper pistons, when rotating; (4) a rotating shaft and rotating wabble hub with a free floating wabble plate, said shaft being journaled at its ends and valved to successfully interconnect operating pistons so as to effect rotation; (5) spring loaded pistons within the circuit to dampen the pressure surges within the circuit known as "water hammer"; (6) a floating wabble plate mounted directly on antifriction bearings either in fixed position on a hub, or mounted on a pivoted hub so that its tilt can be adjustable, and pistons engaging the wabble plate from both sides; (7) a hydraulic pump or motor in which the only rotating parts are the wabble plate, bearings, wabble hub, and shaft, in which the valving is completely arranged by appropriate porting in the shaft journal bearings; (8) annular grooves about the shaft communicating with the ducts in the shaft so that constant pressure and exhaust connections can be made to the ducts in the shaft without imposing a radial thrust upon the shaft; and (9) an arrangement whereby the pump or motor can be disassembled by removing part of piping and half of the pump or motor casing without dismounting the other half of the casing.

I will explain the invention with reference to the accompanying drawings which illustrate one practical embodiment thereof to enable others familiar with the art to adopt and use the same; and I will summarize in the claims the essential features of the invention, the novel features of construction, the novel combinations of parts, for which protection is desired.

In said drawings:

Fig. 1 is a vertical section through the transmission showing the pump, motor, and sump tank and the fluid circuit and the speed control linkage.

Fig. 2 is a transverse section through the motor on the line 2—2, Fig. 1.

Fig. 3 is a transverse section through the motor on the line 3—3, Fig. 1.

Fig. 4 is a transverse section through the motor on the line 4—4, Fig. 1.

Fig. 5 is an end elevation showing the supercharging pump.

Fig. 6 is a sectional view of the wabble hub pivot.

Fig. 7 is a diagrammatic view showing the direction of the piston thrust on the wabble plate, also showing the direction of the hydraulic thrust upon the shaft; and Fig. 8 is a longitudinal section through a spring-loaded plunger, detached.

The motor unit

One section 10 of the motor casing is partly closed as at 10a to provide a bearing 10b for the driven shaft 20. At this end is a seal 11 to prevent leakage; and the other section 12 is partly closed as at 12a to provide an opposed bearing 12b, which bearing is closed at its outer end by gasket 13 and removable plate 14 secured to section 12 by any suitable means. Casing sections 10 and 12 are secured together intermediate their ends by any suitable means. Spaced cylindrical valve bushings 15 and 16 for shaft 20 are sealed in bearing 12b, and similar spaced cylindrical valve bushings 17 and 18 are sealed in the bearing 10b.

Section 10 is provided in its end wall with radial bores 38, ten such bores evenly spaced apart being indicated in Fig. 2, said bores extending from bearing 10b substantially to the periphery of section 10, and communicating respectively with the outer ends of cylinders 37 in said section which cylinders are disposed parallel with the shaft 20. The inner ends of cylinders 37 open into the interior of motor casing 10—12, and in each cylinder is a piston 26 (Fig. 8) of greater length than the cylinder, the inner projecting end of which is rounded as at 26a. Similarly, section 12 is provided with ten radial bores 28 (Fig. 4) extending from bearing 12b and communicating respectively with the inner ends of cylinders 27 each having a piston 26 with its rounded inner end 26a extending into the central portion of the casing 10—12.

A wabble hub 21—22 is provided within casing 10—12, bored to receive shaft 20 and machined on its exterior to carry spaced ball bearings 23 and 24. One side of hub section 21 is fitted to the other side of the hub section 22, and the sections secured together preferably by means of screws and dowels. A set screw 21a having a projection 21b secures the hub 21—22 to shaft 20. A wabble plate 25a is rotatably mounted on bearings 23 and 24 and has a rounded rib 25 engaged by the projecting ends 26a of all the pistons 26 of both sections 10 and 12. Shaft 20, which may be connected to any desired torque receptive device, is centered in the casing by means of the hub 21—22, the sides of which contact the sides of bushings 16—17 respectively.

In shaft 20 are two parallel ducts 45 and 47 extending from its innermost end, the ends of said ducts being closed by plugs 46 secured therein in any desired manner. Ducts 45—47 span the distance between the sets of radial bores 38 and 28, and in shaft opposite the radial bores 38 are diametrically opposed crescent-shaped recesses 20k and 20j (Fig. 2) each extending somewhat less than 180° so that the shaft between the ends of the recesses 20k, 20j will contact squarely with the inner wall of bushing 18. Duct 45 of shaft 20 is connected by a lateral port 20b (Fig. 2) with recess 20k, while duct 47 is connected by an oppositely opening port 20d with recess 20j. In bushing 18 are ten evenly spaced ports 39 (Fig. 2) in alignment with the radial bores 38 respectively, whereby fluid may flow from the cylinders 37 to ducts 45—47 or vice versa.

Similarly, shaft 20 is provided, opposite the radial bores 28, with two diametrically opposed crescent-shaped recesses 20i and 20h (Fig. 4) parallel respectively with recesses 20k, 20j, and a lateral port 20a (Fig. 4) connects duct 45 of shaft 20 with the recess 20h disposed on the opposite side of the shaft from recess 20k, while an oppositely opening port 20c connects duct 47 with recess 20i disposed on the opposite side of shaft 20 from recess 20j. Thus the ends of ducts 45 and 47 communicate respectively with crescent-shaped recesses disposed on opposite sides of the shaft. In cylindrical bushing 15 are ten ports 29 communicating with the radial ducts 28 respectively, as shown in Fig. 4.

Fluid under pressure enters the motor casing 10—12 through inlet pipe 40 and passes through duct 41 into annular groove 42 (Fig. 3), thence through the opening between spaced bushings 17 and 18 and into a transverse slot 44 in shaft 20 which cuts through duct 45. The fluid then passes through duct 45 and through its ports 20a and 20b, into bushing ports 29 and 39 respectively. The fluid returns through ports 20c and 20d into duct 47 of the shaft, and from duct 47 the fluid passes through transverse slot 54 in shaft 20 which cuts through duct 47, and through the opening between spaced bushings 15 and 16 into annular groove 52, thence through duct 51 and into outlet pipe 50, the arrangement of annular groove 52, duct 51 and slot 54 being similar to the groove 42, duct 41, and slot 44 shown in Fig. 3, except that slot 54 opens into duct 47 of shaft 20 and is disposed in the opposite side of shaft 20 from slot 44 which opens into duct 45.

When the fluid enters the motor through pipe 40, it thus passes directly and unobstructedly into duct 45 of shaft 20 and emerges from port 20a (Fig. 4) into the crescent recess 20h and thence through those bushing ports 29 which are momentarily in register with recess 20h, and through their related radial bores 28 into the related cylinders 27. Thus all pistons in cylinders 27 to the right of the vertical, in the position of shaft 20 shown in Fig. 4 will be under pressure and will be caused to exert force on rounded rib 25a of wabble plate 25. Likewise the fluid in duct 45 will simultaneously emerge through port 20b (Fig. 2) at the opposite end of shaft 20, into crescent-shaped groove 20k, and in a manner similar to that above described, the pistons 26 in cylinders 37 of section 10 to the left of the vertical (Fig. 2) will be under pressure through their related bushing ports 39 and radial bores 38 and thereby caused to exert force on the wabble plate 25 in the opposite direction and on the other side of the vertical from the pistons in section 12.

When all pistons 26 to the right of the vertical in Fig. 4 and to the left of the vertical in Fig. 2 are under pressure, the wabble plate 25 is caused to tilt, and this tilting of the wabble plate, acting through ball bearings 23 and 24, causes the wabble hub 21—22 to rotate in the direction of the direction arrow (Fig. 1) on shaft 20. Thus wabble plate 25 does not rotate with hub 21—22, but rotates only very slowly as the rib 25a engages the rounded ends 26a of pistons 26. The slow rotation of wabble plate 25 sets up rotation of the pistons 26 during their mutual engagement, and this rolling action of the pistons greatly lessens the sliding friction between wabble plate 25 and pistons 26.

When shaft 20 and hub 21—22 are caused to rotate by the tilt of wabble plate 25, the remaining pistons 26 in casing section 12, i. e., those to the left of the vertical in Fig. 4, force the fluid in their related cylinders 27 back into the crescent-shaped recess 20i (Fig. 4) and through port 20c into the shaft duct 47; also the remaining pistons 26, i. e., those to the right of the vertical in Fig. 2 are ejecting the fluid from their related cylinders 37 into the crescent recess 20j (Fig. 2) and through port 20d into shaft duct 47. From duct 47 the fluid passes through slot 54 (Fig. 1) to annular recess 52, duct 51, and into outlet pipe 50. By the above construction, no flat surface fitted or gasket joints are necessary to maintain a fluid seal in either the pressure or exhaust lines, and tremendous pressure may be used since there are no gaskets which might blow out in the pressure ducts.

Piston valves shown at 70 in the motor casing sections 10 and 12 (Figs. 1 and 3) act both as emergency relief valves and as dampeners for pressure impulses which act to cause noisy blows or raps known as "water hammers" within the fluid circuit. These pistons are slidably mounted in ducts 80 leading into the annular grooves 42 and 52, the pistons being normally urged into said grooves by springs 74 interposed between the pistons and plugs 81 threaded into the outer ends of the bores. When pistons 70 are forced back against the action of springs 74, by excessive pressures of liquid within the annular grooves 42 or 52, the pistons pass upwardly beyond relief holes 72 (Fig. 1) and permit liquid to by-pass out of the fluid circuit into the central portion of the motor casing. The strength of springs 74 is such that pistons 70 do not act unless operation of the transmission has caused excessive and unsafe pressures. Holes 71 are also provided above holes 72 and function to allow free passage of air or liquid to permit the flexing of springs 74 under the influence of pistons 70.

The above described motor unit is exceptionally compact in design and has only a few rotating parts. This unit is normally mounted on a suitable support from flange 10p, and the drive is taken off of shaft 20 by an appropriate fitting or coupling on shaft extension 20p having key 20q.

The direction of rotation of the motor unit can be reversed by releasing screw 21a and rotating hub 21—22 to a position 180° from the position shown in Fig. 1 and then engaging screw 21a into hole 21c in shaft 20, to lock the hub on the shaft.

I prefer to use for the piston 26 the type shown in Fig. 8 in which the plunger shell 26 is partly closed at the rounded end 26a, and carries an inner piston 26x and a spring 26y, thus forming a spring loaded inner piston within the ordinary piston. A hole 26z is provided in the end 26a which engages the wabble plate 25 to allow free passage of air and fluid out of the spring compartment. This type of piston will correct any slight rattle which may arise when a piston cylinder shifts from pressure to exhaust, and vice versa. At such time there is an interval when the cylinder is neither under pressure or exhaust, and the related piston may not proceed in its travel to complete its stroke. Thus when the wabble plate 25 continues through its stroke an ordinary solid piston will not maintain constant contact with the wabble plate during this interval, and subsequent reengagement of the solid piston with the wabble plate will cause a click which might develop into a definite rattle when the unit is operating. By using a spring loaded inner piston 26x within the piston 26 engaged by spring 26y under compression, the force of the spring will maintain the piston against the wabble plate at all times, and such construction is very successful in practice. If the valve porting is made such that the pressure port closes just as the exhaust port opens, there will be no interval at which the piston will leave the wabble plate. However, if the valve ports are so arranged, there will be considerable loss of pressure through the pressure port that has just been closed, since the metal overlap between the pressure area and the piston port area, and the piston port area and the exhaust area, is so small that the fluid under pressure leaks past the seal due to the small amount of metal overlap at the seal. This loss of pressure would be particularly noticeable when the motor unit is operated at very low speeds.

*The pump unit*

The pump unit is in general similar to the motor unit, and comprises a casing section 100 partly closed at end 100a to form a bearing for pump shaft 200, same being fitted with a seal 110; also a casing section 120 which is partly closed at 120a to form a bearing for the pump shaft. The general construction of the parts, such as the wabble plate 250, pistons 260, and the general arrangement of the cylinders 270 as well as the radial bores 280 and 380, and the ports 290 and 390, are the same as for the related parts above described with respect to the motor unit; also the general description of the hydraulic operation of the motor as explained above and depicted in Figs. 2-4 apply also to the pump unit.

Rotation of driving shaft 200 of the pump in the direction shown by the arrow in Fig. 1 by a prime mover having a shaft projecting into recess 202 and engaging a key 200q, causes rotation of wabble hub 210 through diametrically opposed pivot projections 201 (Figs. 1 and 6) on shaft 200 which project through openings in hub 210, said projections being secured to lugs on shaft 200 by means of screws 201a. Mounted on wabble hub 210 are ball bearings 230, 240, a ring 212 on hub 210 maintaining bearings 230 and 240 in spaced relation, and the bearings being held on the hub by a locknut 215 secured by lock washer 214. When driving shaft 200 is rotated a corresponding rotation of the tilted wabble hub 210 is produced, while the wabble plate 250 carried thereon rotates slowly in engagement with the rounded outer ends of pistons 260, thus causing pistons 260 to reciprocate, and also to rotate slowly in order to lessen sliding friction between wabble plate 250 and pistons 260.

The pistons in pump section 120 which are causing fluid to move out of the radial ducts 280 through ports 290 correspond with the pistons shown to the left of the vertical in Fig. 2. Likewise the pistons equivalent to those at the right of the vertical in Fig. 4 are causing the flow of fluid out of the ducts 380 and ports 390 in casing section 100, Fig. 1. The fluid forced out by the pistons enters the shaft duct 450 through ports 200a and 200b, and from duct 450 the fluid passes through slot 440 in shaft 200, through annular groove 420 fitted with a relief valve 700 similar to valves 70 of the motor casing, the fluid passing from thence through outlet duct 410 of the pump into pipe 40 which leads to the motor. In event the fluid pressure in pipe 40 is in excess of the setting of valve spring 501 in by-pass 502, the fluid will pass through pipe 502, lifting ball 503, and discharge into pump inlet pipe 504.

The fluid returning to the pump from the motor through pipe 50 passes through pipe 504 and into inlet pocket 505, and thence flows directly into pump shaft duct 470, the end of which in pocket 505 is open while the end of duct 450 is closed by plug 460. From duct 470 the fluid passes through ports 200c and 200d and enters the registering cylinders 270 in section 120 and in section 100 in the same manner previously described with respect to the motor.

In order to furnish fluid for supercharging the system and to supply fluid to compensate for any that may leak past the pistons or the journal valves, a small gear pump is provided consisting of gear 221 (Figs. 1 and 5) mounted on the end of shaft 200 and meshing with a gear 222 mounted on stub shaft 223, said gears operating in a duct 120x to force fluid which is drawn upwardly by pump 221—222 through pipe 506 from a sump tank 300 into inlet pocket 505, as shown by the arrows in Fig. 5.

A leak return pipe 55 from the motor, and a pipe 550 from the pump, are provided to carry any fluid leakage within the respective units back to the sump 300. Ducts 56 and 57 in the motor, and duct 570 in the pump are provided to return to the inside of the motor and pump casings, respectively, any leakage which may occur at the ends of the shaft 20 and 200.

The adjustment of the delivery of the pump unit is accomplished through a hand knob 605 pinned to a screw shaft 603 held in place in a bore in section 120 by a collar 604. Screw 603 is threaded into a yoke 602 which engages a slot 600a in collar 600 slidably and loosely mounted on shaft 200. A link 216 connects collar 600 with wabble hub 210 by means of pins 601 and 215. As hand knob 605 is rotated, collar 600 is shifted axially of shaft 200 by screw 603 and yoke piece 602, and hub 210 is accordingly tilted on its pivots 201. Regulation of the tilt of wabble plate 250 is such that when the tilt is reduced the stroke of pistons 260 is decreased, thus reducing the delivery of the pump unit.

The design of the unit is such that the thrusts on the rotating parts are balanced by similar thrusts in the opposite directions, thus effecting a complete balance of the rotating parts. Figs. 2 and 4 indicate twenty pistons in the motor (or pump) unit. The five pistons to the right of the center line in Fig. 4 are under pressure, and the five to the left of the center line in Fig. 2 are also under pressure. This condition is diagrammatically illustrated in Fig. 7, in which five pistons indicate a thrust on the wabble 25 in one direction, and five pistons indicate a thrust thereon in the opposite direction, the thrusts thus balancing each other so that no resultant force is applied axially of the shaft 20, also shown in perspective in Fig. 7. The thrusts of the pistons, however, on the left of the vertical in Fig. 7, being opposite in direction from those at the right of the vertical, act to develop a moment which would tilt the wabble plate in a clockwise direction if it were not for the fact that a like counter moment is developed on shaft 20 as indicated by the arrows shown in Fig. 7 due to the fact that the hydraulic pressure areas on the ends of the shafts are on opposite sides. The moment developed on the wabble 25 is opposite in direction to the moment developed on the shaft 20, and as the shaft in both units supports the wabble, the moments thus developed counteract each other within the combined rotating parts. By thus opposing hydraulic thrusts against themselves, a unit is provided in which the rotating parts operate at a high degree of efficiency and will have a considerably longer operating life, since the rotating parts do not operate under heavy thrusts, but instead rotate in complete hydraulic balance.

The drawings show a construction such that the pistons directly engage the wabble plate. It is understood however that piston rods could be journaled in the pistons and also journaled in the wabble plate if means are provided to prevent rotation of the wabble plate. Said construction would not in general affect or change the operation of the units.

I claim:

1. In mechanism of the character specified, a casing; a shaft journaled therein; a wabble plate floating on said shaft and having a rounded periphery; opposed sets of cylinders in the casing disposed at opposite sides of the plate; pistons in the cylinders having rounded ends engaging the rounded periphery of the wabble plate whereby the pistons have a point contact therewith to cause the pistons to rotate in their cylinders; and a fluid circuit including said cylinders.

2. In mechanism as set forth in claim 1, the points of contact being disposed between the axes of the pistons and their peripheries whereby the pistons will be caused to rotate in the same direction.

3. In mechanism of the character described, a casing comprising opposed cup-shaped members connected together; each member having a partly closed end forming a bearing; a pair of spaced cylindrical bushings sealed in each bearing; a rotary shaft journaled in the pairs of bushings in said respective members; groups of cylinders in the respective members of the casing having fluid ducts registering with ports in one bushing of each pair; pistons in said cylinders; means operative to convert reciprocatory motion of the pistons into rotary motion of the shaft; said shaft having a pair of bores provided with recesses forming valve ports registering with said ports in the bushings respectively to form interconnecting fluid circuits between the ducts of the groups of cylinders; the spaces between the bushings of each pair forming annular grooves around the shaft; a fluid inlet in one member of the casing leading into its related groove and registering with a shaft opening into one said shaft bore; and a fluid outlet in the other member of the casing leading from its related groove and registering with a shaft opening into the other said shaft bore.

4. In mechanism as set forth in claim 3, relief valves in said annular intake and exhaust grooves respectively opening into the interior of the casing; and a drain for removing liquids from the casing interior.

5. In mechanism of the character described, a casing comprising opposed cup-shaped members connected together; each member having a partly closed end forming a bearing; a pair of spaced cylindrical bushings sealed in each bearing; a rotary shaft journaled in the pairs of bushings in said respective members; groups of cylinders in the respective members of the casing having fluid ducts registering with ports in one bushing of each pair; pistons in said cylinders; means operative to convert reciprocatory motion of the pistons into rotary motion of the shaft; said shaft having a pair of bores therein for fluid pressure and exhaust respectively, the adjacent ends of said pair having communicating recesses respectively forming opposite pressure and exhaust radial valve ports registering with the ports in the bushings respectively; the spaces between the bushings of each pair forming annular grooves around the shaft; a fluid inlet in one member of the casing leading into the related groove and registering with a shaft opening into one said shaft bore; and a fluid outlet in the other member of the casing leading from its related groove and registering with a shaft opening into the other said shaft bore.

6. In mechanism as set forth in claim 5, relief valves in said annular intake and exhaust grooves respectively opening into the interior of the casing; and a drain for removing liquids from the casing interior.

7. In mechanism of the character described, a casing comprising opposed cup-shaped members connected together; each member having a partly closed end forming a bearing; a pair of spaced cylindrical bushings sealed in each bearing; a rotary shaft journaled in the pairs of bushings in said respective members; a wabble plate on said shaft; opposed groups of cylinders in the respective members of the casing having fluid ducts registering with ports in one bushing of each pair; pistons in said cylinders of the groups engaging opposite faces respectively of the wabble plate; said shaft having a pair of bores for fluid pressure and exhaust respectively, and having communicating recesses forming opposite pressure and exhaust radial valve ports registering with said ports in the bushings respectively; the spaces between the bushings of each pair forming annular grooves around the shaft; a fluid inlet in one member of the casing leading into the related groove and registering with a shaft opening into one said shaft bore; and a fluid outlet in the other member of the casing leading from its related groove and registering with a shaft opening into the other said shaft bore.

8. In mechanism as set forth in claim 7, said wabble plate being pivoted on said shaft; a rotatable sleeve slidably mounted on the shaft and linked to the plate, a yoke controlling the axial position of said sleeve, and a screw shaft journaled in one member of the casing having a threaded engagement with the yoke, whereby rotation of the screw shaft will tilt the wabble plate on its pivots.

9. In mechanism as set forth in claim 7, relief valves in said annular intake and exhaust grooves respectively opening into the interior of the casing; and a drain for removing liquids from the casing interior.

10. In mechanism of the character described, a casing; a shaft journaled therein; a wabble plate floating on said shaft; opposed groups of cylinders in the casing disposed at opposite sides of the plate; pistons in the said cylinders of the groups having rounded ends engaging opposite faces respectively of the wabble plate, whereby the pistons have a point contact with the plate to cause the pistons to rotate in their cylinders; and a fluid circuit including said cylinders.

11. In mechanism as set forth in claim 10, the point of contact being disposed between the axes of the pistons and their peripheries, whereby the pistons are caused to rotate in the same direction.

12. In combination with mechanism as set forth in claim 10, a hub on said shaft supporting the wabble plate; a pin carried by said hub engaging a hole in said shaft; and said shaft having a second hole therein spaced 180° from the first mentioned hole and adapted to be engaged by said pin for securing the hub on the shaft into position to effect reversal of direction of rotation of the shaft.

13. In combination with mechanism as set forth in claim 10, a hub pivoted on said shaft supporting the wabble plate; a rotatable sleeve slidably mounted on said shaft and linked to the hub; a yoke controlling the axial position of the sleeve; and a screw shaft journaled in the casing and having a threaded engagement with the yoke, whereby rotation of the screw shaft will tilt the hub and retain same in adjusted position.

ROBERT S. CONDON.